Aug. 18, 1959          G. L. SELLS          2,899,989
PORTABLE POWER SAW WITH GUIDE
Filed Dec. 17, 1956          2 Sheets-Sheet 1
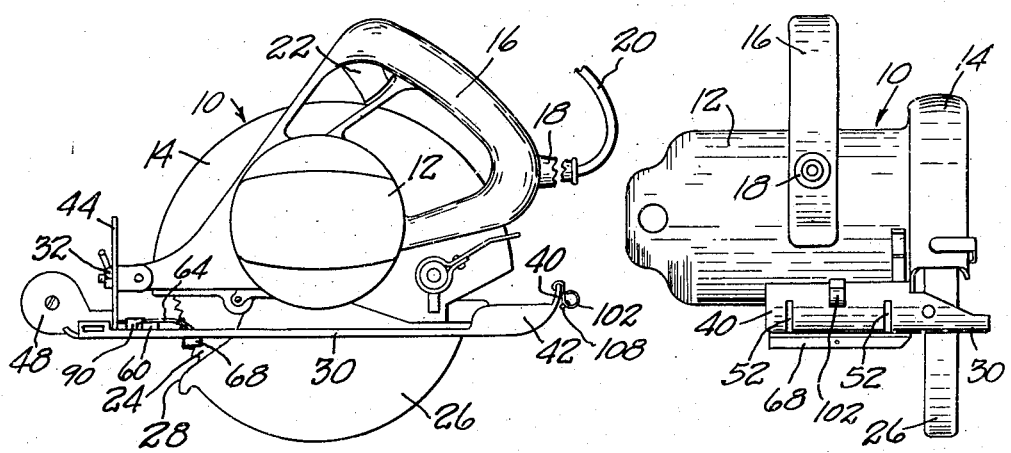
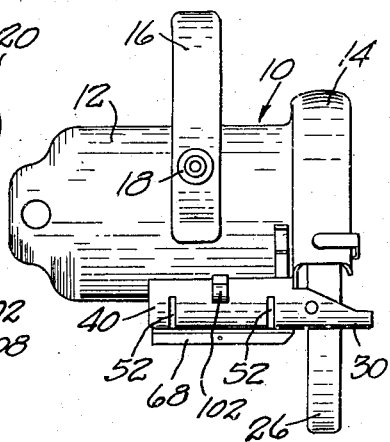
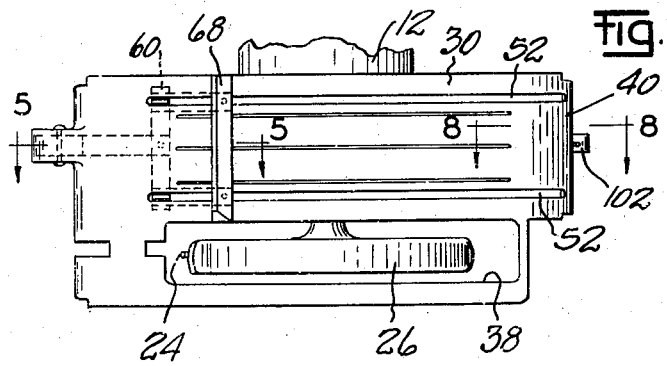
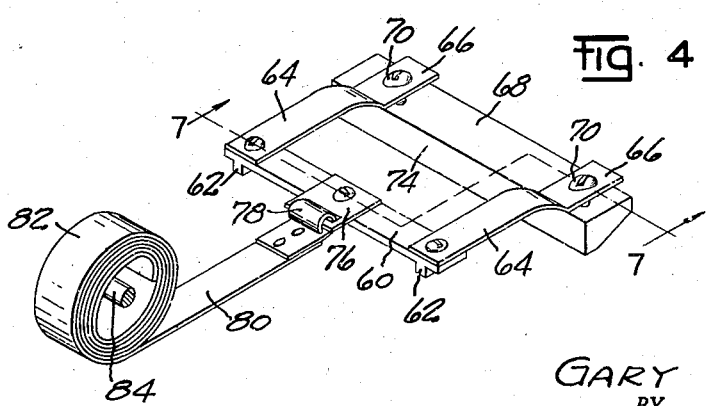
INVENTOR.
GARY L. SELLS.
BY Eugene C. Knoblock
ATTORNEY

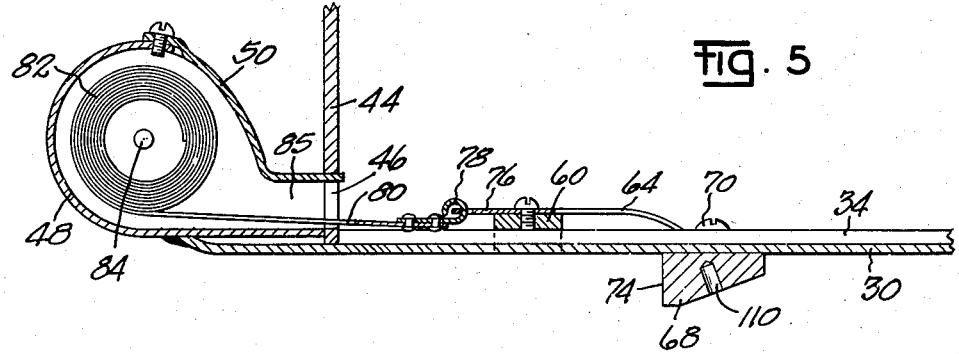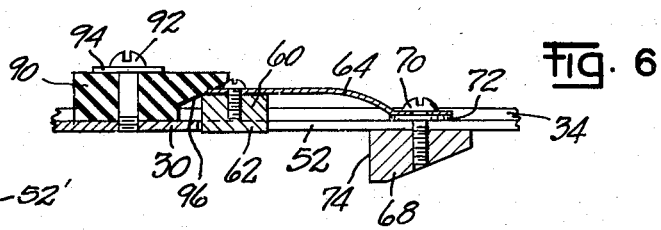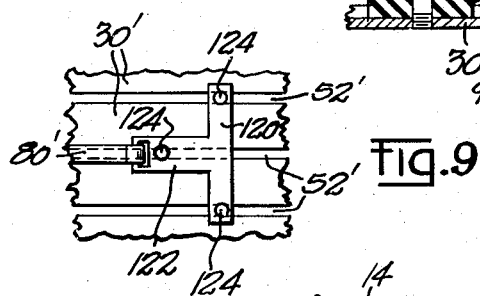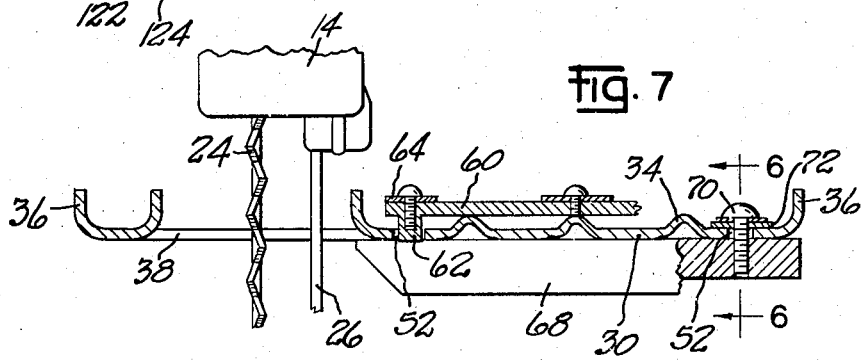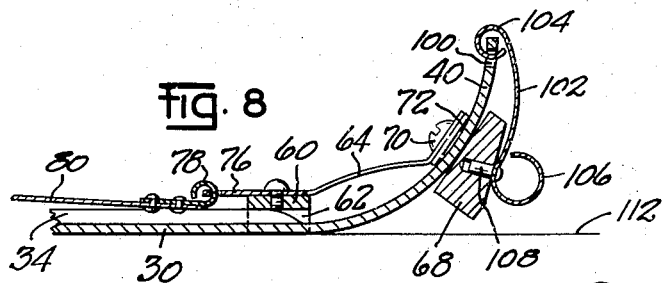

United States Patent Office 2,899,989
Patented Aug. 18, 1959

2,899,989

PORTABLE POWER SAW WITH GUIDE

Gary L. Sells, South Bend, Ind.

Application December 17, 1956, Serial No. 628,607

9 Claims. (Cl. 143—43)

This invention relates to portable power saw with guide.

The primary object of this invention is to provide a portable power saw with self-contained means mounted thereon and engageable with the work piece to guide the operation of cutting the work piece accurately perpendicularly to the edge thereof without interfering with the work and without requiring special skill on the part of the operator.

A further object is to provide a portable power saw with a work-abutting member projecting therefrom and shiftable thereon between a starting position engageable with the work when the cutting operation starts and a released position adapted to free the guide from the work at a predetermined position in the stroke of the saw.

A further object is to provide a portable power saw with a guide adapted to traverse a base plate in a guided path, said base plate having a curved end portion along which the guide is adapted to move to a position clear of the work piece, and further to provide a latch for anchoring the guide at said curved end in out of the way position.

A further object is to provide a portable power saw with a guide shiftable in a predetermined path and in a predetermined relation to the saw, said guide being normally spring urged to a starting position and shiftable against spring resistance adequate to enable the operator to "feel" the position of the guide with respect to the work piece before the start of the sawing operation.

Other objects will be apparent from the following specification.

In the drawing:

Fig. 1 is a view of a saw with my improved guide viewed in side elevation;

Fig. 2 is an end view of the saw provided with my guide;

Fig. 3 is a fragmentary bottom plan view of a saw equipped with my guide;

Fig. 4 is an enlarged perspective view of the guide showing its association with an operating spring;

Fig. 5 is a longitudinal vertical enlarged fragmentary sectional view taken on line 5—5 of Fig. 3;

Fig. 6 is a fragmentary longitudinal sectional view taken on line 6—6 of Fig. 7 and illustrating a novel stop employed in the device;

Fig. 7 is a sectional view taken on line 7—7 of Fig. 4;

Fig. 8 is a fragmentary enlarged sectional view taken on line 8—8 of Fig. 3; and Fig. 9 is a fragmentary schematic view illustrating a modified embodiment of the invention.

Referring to the drawing, and particularly to Figs. 1 to 8 which illustrate one embodiment of the invention, the numeral 10 designates the housing of a portable power saw which includes a motor housing portion, a saw guard portion 14 and a handle portion 16. The handle or hand grip 16 preferably has a fitting 18 to which a lead wire or extension cord 20 is connected and the handle is preferably hollow to direct lead wires (not shown) therethrough to the motor within the motor housing 12. The hand grip will preferably have a trigger type switch 22 associated therewith. The saw housing may include other parts as well known or as found suitable or desirable.

The saw blade 24 is rotatably mounted in the saw housing 10 in the outline of the blade guard 14 thereof to be driven by the motor. The guard 14 is part-circular so that the blade 24 projects therefrom. The portion of the saw blade which is exposed is limited, however, by a pivoted arcuate guard 26 fitting with clearance around the blade 24 and retractable into guard 14 and having a normal spring urged guarding position as illustrated in Fig. 1. Pivot means (not shown) accommodate pivoting of the guard 26 about an axis concentric with the saw blade 24 as the front cammed edge 28 of the guard engages the work piece. This construction is substantially conventional and forms no part of my invention.

A base plate or slide 30 is carried by the saw housing 10 in adjustable relation thereto controlled by suitable clamp or adjusting means, such as the angle adjustment means 32. The slide 30 is positioned adjacent the lower open end of the part-circular guard 14 and in a plane intersecting the saw blade 24. The slide may be of any suitable shape and construction, and I prefer a construction as illustrated in cross-section in Fig. 7 wherein longitudinally extending ribs 34 are offset from the plane of the plate 30 at spaced points to rigidify the same and wherein the marginal flanges 36 are bent from the plate to further reinforce and strengthen the same. The plate is provided with an elongated opening 38 for passage of the saw blade and the saw guard 26 therethrough. The base 30 is preferably of a length greater than the diameter of the saw guard portion 14 to project therebeyond at opposite ends thereof. At one end the plate is preferably bent arcuately at 40 and side flanges 42 may be provided to rigidify and reinforce this end part of the blade. The adjustment means for blade 30 at one end opposite the curved part 40 preferably includes perpendicularly extending member 44. The plate 44 preferably has an aperture 46 adjacent plate 30 and has also associated therewith fixed part 48 and cover part 50 of a housing of part-cylindrical shape or configuration, for purposes to be mentioned. The plate 30 also includes a plurality of longitudinal parallel slots 52 which extend for the major portion of the length thereof, with one end portion of each slot extending into and through a part of the curved end portion 40 of the plate, and the opposite end terminating adjacent to but spaced from the housing 48 and the adjustment plate 44.

A guide slide unit is mounted upon the plate 30 to traverse the same in a guided path and in a predetermined relation to the plate under the guidance of the guide slots 52 thereof. This slide may be of the construction illustrated in Fig. 4, which is characterized by a cross bar 60 bearing upon the top surface of the plate 30 at one side of the saw blade and the saw blade receiving aperture 38 as best seen in Fig. 3. Depending projections 62 are carried by opposite ends of the cross bar 60 and have a snug sliding fit within the slots 52. A pair of metal resilient straps 64 are fixedly secured to the cross bar 60 in spaced relation at opposite ends thereof and project therefrom to terminate in offset end portions 66. The straps 64 are preferably of equal length, and the portions 66 thereof serve to mount a work-engaging bar 68 secured thereto by machine screws or other suitable securing members 70. The work-engaging bar 68 has a sliding engagement with the bottom face of the plate 30, and a washer 72 encircles the shank of each securing member 70 and bears against the upper face of the plate 30. The washer 72 preferably has a convex plate-engaging face whose curvature accommodates traverse of the curved portion 40 of the base plate 30, as illustrated in Fig. 8, without binding as it passes over the concave surface of the plate part 40. Also, the washer may be screw-threaded on member 70. The parts 60, 64, 66 and 68 constitute a parallelogram. The passage of the shanks of the securing members 70 through the slots 52, in addition to the reception of the projections 62 in said slots, maintain the parallelogram in a fixed orientation, assuring a constant angular relationship between the work-engaging straight edge surface 74 of the work-engaging member 68 and the saw blade by virtue of the parallel relation of the slots 52 to the saw blade 24.

The cross bar 60 of the slide includes a fixture 76 to which is anchored, as at a looped portion 78 thereof, one end of spring unit 80. As here shown the spring unit 80 preferably constitutes a spring metal strap biased to a coil form and extensible to substantially straight form against the spring tension exerted thereby. In other words, the spring member 80 constitutes a unit comparable to a coiled metal extensible tape rule. The coil portion 82 of the spring is confined within the housing portion 48 which preferably has a removable center pin 84 for orienting the portion 82 within the housing part 48. The housing part 48 preferably includes a rearwardly projecting guide passage 85 communicating with opening 46 in plate 44 to accommodate longitudinal ejection and retraction of the spring member 80 as the slide unit travels lengthwise of the base plate 30 during operation of the saw.

A stop is mounted upon the upper face of the plate 30 for engagement with the slide to normally position the same near the left-hand or front end of the slots 52 as seen in Fig. 3. This stop may take the form illustrated in Fig. 6 and in particular may constitute one or more stop members 90 preferably formed of rubber, synthetic rubber or other resilient material. The stop member 90 is secured to the plate 30 by securing member 92, such as a machine screw having an enlarged head. A washer 94 may bear against the upper surface of the stop body 90 and be pressed thereagainst by the head of the securing member 92. The edge 96 of the stop member 90 which confronts and is engaged by the slide, as by the transverse slide part 60, is preferably inclined and undercut substantially as illustrated in Fig. 6, so that when the body 90 is of a thickness greater than the thickness of the slide part 60 engaging the same, the slide part will wedge thereunder upon return of the slide from the position illustrated in Fig. 8 to the position illustrated in Figs. 5 and 6. The stop will preferably be so positioned that it cushions the spring return movement of the slide by preventing engagement of the projections 62 with the ends of the slots 52. Also the wedging action of the slide at the end surface 96 of the stop 90 will be of sufficient strength to hold the slide firmly in place so that at least a noticeable amount of exertion is required to move the slide away from the stop 90. This permits the operator to determine in advance of the sawing operation whether the work-engaging surface 74 of the work-engaging member 68 is firmly abutted with the edge of the work piece. In other words, this provides means for the operator to "feel" the orientation of the guide to the work piece.

The free end portion of the curved section 40 of the plate 30 is preferably apertured at 100 to pivotally mount a latch or retaining member for the part 68. This latch may take the form illustrated in Fig. 8, wherein a metal strap 102 has a loop 104 extending into the slot 100 and accommodating pivoting of the member 102, and the opposite end of the member 102 is looped at 106 to provide a finger-engaging part. A pin 108 is carried by the latch plate 102 projecting angularly therefrom and is adapted for insertion in an aperture 110, Fig. 5, in the work-engaging member 68 as shown in Fig. 8 to hold the guide member 68 in a position on the convex surface 40 of the plate clear of the plane 112 of the bottom surface of the plate 30. By means of this latching member it is possible to hold the work-engaging member 68 in a position clear of the work piece during the operation of the saw when that becomes desirable.

The form of the slide and its association with the base plate 30 may be altered from that shown and described above in any manner found suitable. An alternative arrangement is illustrated in Fig. 9 where the plate 30', which constitutes the work-engaging plate of the saw, has three spaced parallel slots 52' extending lengthwise thereof and parallel to the saw blade. A member preferably including a transverse part 120 and a forwardly projecting part 122 in fixed relation to each other, carries pins or projections 124, each having a snug sliding fit in one of the slots 52'. The pin or projections 124 are so spaced and arranged as to define the points of the triangle as illustrated in Fig. 9. A work-engaging member, similar to the member 68, is carried by this slide structure and may form a part of it, although preferably the parts 120 and 122 will be located at the top of the plate and a separate work-engaging member carried thereby will be located below the plate. The slide unit 120, 122 will have connection with a spring unit 80' for urging the same to a rest or starting position.

In the use of the device in all forms thereof, the work-engaging member 68 and its associated slide and guide parts will be carried by the base plate 30 in a substantially protected self-contained relation. Thus the spring 80, 82 will be principally confined within the housing 48 and the portion thereof which projects from that housing for connection with the slide will be located at the upper surface of the plate free from engagement with the work and from interference with its normal functioning during the sawing operation. Only the work-engaging member 68 is located below the plate 30, and that is positioned clear of but adjacent to the saw blade, as best seen in Figs. 2 and 3. The spring pressure exerted upon the slide which includes the guide member urges the same against the resilient stop 90 so that the slide is restrained against free movement. In cases where the resilient wedging stop shown in Fig. 6 is employed, the retention of the slide is more positive in its functioning as mentioned above.

In use, the saw is applied to the work by resting the base plate 30 upon the top surface thereof and moving the plate upon the surface of the work carefully for full face engagement of the surface 74 of the member 68 against the edge of the work piece to insure orientation of the blade to the work piece and in particular to insure that the blade 24 is located perpendicularly to the edge of the work piece which is engaged by the guide member 68. Because of the retention of the slide by the wedging stop 90, the workman can slightly manipulate the saw to insure that the member 68 engages the work piece the full length thereof rather than at one end only thereof. When the proper orientation of the saw with the work has been "felt," the saw is pushed by means of the handle grip 16 in a direction to retain the member 68 in abutment with the work piece edge. Thus an assured straight cut is formed truly perpendicular to the edge of the work piece.

As the cut is formed the guide bar 68 slides lengthwise of the plate 30 behind the cut. In cases where the member being cut is of a width greater than the length of the plate 30, the sawing operation will result in the shifting of the work-abutment member 68 around the bent portion 40 of the plate to a position riding on the work piece surface 112. Thus the use of the guide on the saw imposes no limit upon the width of the work piece which can be cut. There is, of course, a limit upon the extent of the guiding function served by the device when acting upon pieces of substantial width. In other words, when the work-engaging member 68 travels around the bent portion 40 to a position to engage the top surface of the work in the plane 112 rather than the end edge thereof, the guiding function served by the device up until that time ceases.

It will be noted in Fig. 8 that the resilient nature of the parts 64 of the slide accommodates a traversing of the bent portion 40 of the plate. In other words, the construction is such that the projections 62 upon the slide member 60 remain in guiding position within the portion of the slot formed in the flat part of plate 30 while the shanks of the securing members 70 pass through portions of the slot in the curved part of the plate 40. Thus no binding action results from the traverse of the slide parts 70 through the parts of the slots 52 formed in the curved end portion 40 of the base plate. As soon as the sawing operation is completed and the saw is disengaged from the work, the slide and guide return to their starting position under the influence of the spring.

While the preferred embodiments of the invention have been illustrated and described herein, it will be understood that changes in the construction may be made within the scope of the appended claims without departing from the spirit of the invention.

I claim:

1. A portable power saw comprising a housing, a saw blade, a base plate carried by said housing, a work-engaging member, and means bodily mounting said member on said plate for movement in a guided path relative to said blade, said base plate having an upwardly curved end portion, traversible by said member, said last named means including a rigid plate traversing part and a resilient portion mounting said member and yielding to accommodate relative angular movement of part and said member during traverse of said curved plate portion by said member.

2. A portable power saw comprising a housing, a saw blade, a base plate carried by said housing, a work-engaging member, means mounting said member on said plate for movement in a guided path relative to said blade, spring means normally urging said member in one direction, and a resilient abutment on said plate limiting movement of said member by said spring.

3. A portable power saw comprising a housing, a saw blade, a base plate carried by said housing, a work-engaging member, means mounting said member on said plate for movement in a guided path relative to said blade, spring means normally urging said member in one direction, and a resilient abutment on said plate having an undercut surface engaged by and wedging said member in a spring urged starting position.

4. A portable power saw including a housing, a saw blade, a base plate carried by said housing, a work-engaging member, means mounting said member on said plate for movement in a guided path relative to said blade, and a resilient coiled spring strap connected to said member, and a strap retainer carried by said base and accommodating progressive play-out and take-up of said strap upon reciprocating movement of said member in said path.

5. A portable power saw comprising a housing, a saw blade, a base plate carried by said housing, a work-engaging member, a means mounting said member on said plate for movement in a guided path relative to said blade, said last named means including a plurality of spaced slots in said base parallel to said blade and said path, a transverse member above said plate having spaced projections each fitting slidably in a slot, said work-engaging member being located below said plate and spaced from said transverse member, and means connecting said members and including parts extending through said slots spaced from said projections.

6. A portable power saw comprising a housing, a saw blade, a base plate carried by said housing, a work-engaging member, means mounting said member on said plate for movement in a guided path relative to said blade, said last named means including a plurality of spaced slots in said base parallel to said blade and said path, a transverse member above said plate having spaced projections each fitting slidably in a slot, said work-engaging member being located below said plate and spaced from said transverse member, a pair of members carried by said transverse member and extending lengthwise of said base, and securing members connecting said last named members to said work-engaging members and each extending through a slot.

7. A portable power saw comprising a housing, a saw blade, a base plate carried by said housing, a work-engaging member, means mounting said member on said plate for movement in a guided path relative to said blade, said base plate having an upwardly curved trailing end portion, said last named means including a plurality of spaced slots in said base and its curved end portion, a member above said plate having a slot-engaging projection and a resilient portion extending longitudinally of said plate, securing members extending through said slots and connecting said work-engaging member to said resilient position, and a washer encircling each securing member and having a convex surface engaging the upper surface of said plate.

8. A portable power saw comprising a housing, a saw blade, a base plate carried by said housing and having an upwardly curved end portion, a work-engaging member, means mounting said member on said plate for movement in a guided path relative to said blade and said curved end portion, and a retainer carried by the curved end portion of said base for releasably latching said member at said curved base portion and clear of the plane of the major part of said base plate.

9. A portable power saw as defined in claim 8, and spring means normally urging said work-engaging member to a starting position spaced from said curved plate portion.

References Cited in the file of this patent

UNITED STATES PATENTS

| 1,706,115 | Hannah | Mar. 19, 1929 |
| 1,708,345 | Wodack et al. | Apr. 9, 1929 |
| 1,932,511 | Clarke | Oct. 31, 1933 |
| 2,589,554 | Killian | Mar. 18, 1952 |
| 2,630,147 | Garberg | Mar. 3, 1953 |
| 2,659,399 | Doug | Nov. 17, 1953 |
| 2,802,493 | Horreland | Aug. 13, 1957 |